United States Patent
Cronk et al.

(10) Patent No.: US 7,487,342 B2
(45) Date of Patent: Feb. 3, 2009

(54) METHOD AND APPARATUS FOR STARTING UP AND MAINTAINING OF MULTIPLE NETWORKED COMPUTING SYSTEMS

(75) Inventors: Matthew Slade Cronk, Austin, TX (US); Chris Alan Schwendiman, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 965 days.

(21) Appl. No.: 10/646,447

(22) Filed: Aug. 22, 2003

(65) Prior Publication Data

US 2005/0044346 A1 Feb. 24, 2005

(51) Int. Cl.
*G06F 9/00* (2006.01)
(52) U.S. Cl. .......................................... 713/1; 710/313
(58) Field of Classification Search ...................... 713/1; 710/313
See application file for complete search history.

(56) References Cited

U.S. PATENT DOCUMENTS

| 5,948,101 | A  | * | 9/1999  | David et al. ..................... 713/2  |
| 6,202,091 | B1 | * | 3/2001  | Godse ........................ 709/222 |
| 6,286,038 | B1 | * | 9/2001  | Reichmeyer et al. ........ 709/220 |
| 6,523,082 | B1 | * | 2/2003  | Yoshida ....................... 710/313 |
| 6,757,723 | B1 | * | 6/2004  | O'Toole et al. ............. 709/222 |
| 6,988,193 | B2 | * | 1/2006  | French et al. ................... 713/2 |
| 7,089,300 | B1 | * | 8/2006  | Birse et al. .................. 709/221 |
| 2003/0005096 | A1 | * | 1/2003  | Paul et al. .................... 709/222 |
| 2003/0097556 | A1 | * | 5/2003  | Gilbert et al. .................. 713/2 |
| 2003/0195951 | A1 | * | 10/2003 | Wittel et al. ................ 709/220 |
| 2004/0006688 | A1 | * | 1/2004  | Pike et al. ...................... 713/1 |

* cited by examiner

*Primary Examiner*—Chun Cao
*Assistant Examiner*—Vincent T Tran
(74) *Attorney, Agent, or Firm*—Diana R. Gerhardt; Dillon & Yudell LLP

(57) ABSTRACT

A method for starting up and maintaining multiple networked computing systems by using a common start-up program located in one place within a network is disclosed. Start-up code is partitioned into two sections: common start-up code and unique driver programs. Common start-up code includes instructions causing common components in each networked computing system to start-up resides in one location on networked media. Executing a networked computer's boot program instructions causes common start-up code to be retrieved from networked media and executed. Executing common start-up code instructions causes unique driver programs comprising instructions for starting up unique components in each networked computer to be read from networked media by each networked computer. Each networked computing system executes common start-up code instructions and unique driver program instructions to configure and start the networked computing system.

9 Claims, 5 Drawing Sheets

METHOD AND APPARATUS FOR STARTING UP AND MAINTAINING OF MULTIPLE NETWORKED COMPUTING SYSTEMS

BACKGROUND OF THE INVENTION

1. Technical Field

The present invention relates in general to managing computing systems. More particularly, the present invention relates to starting up and maintaining computing systems. Still more particularly, the present invention relates to starting up and maintaining of multiple networked computing systems by using a common start-up program located within a computer network.

2. Description of the Related Art

The process of starting up a computer from a stopped or powered off condition is called "booting." The boot process begins when the computer is turned on. During the boot process, the computer's processor begins to execute a small code segment that resides someplace on the computer in memory causing the computer to retrieve a start-up program at a location directed by the executing code segment. The computer could retrieve a start-up program from multiple sources including its own hard drive, a diskette, or externally. In the latter case, the computer can retrieve the start-up program via any of its input/output ports as directed by the executing code segment.

The computer's processor executes the start-up code once it has been retrieved. The start-up code instructions cause the computer to perform the steps of identifying and configuring the computer's devices, initializing the operating system, and starting the computer system processes. In the final step, the start-up code causes the computer to make the system ready for use.

In many settings such as offices, schools, and laboratories, individuals use computers that are networked together with access to a central server. When an individual boots a computer, the start-up code the computer uses to boot is typically located at the local computer. Typically, every computer model requires its own start-up code for its unique features and peripherals. Each time a system upgrade is performed each networked computer's start-up code must be modified by a process that is both time and labor intensive.

Therefore, there is a need in the industry for a method to more efficiently boot and maintain multiple networked computer systems by using a compact common start-up program located within a network.

SUMMARY OF THE INVENTION

Sparse labor resources would be made available for more pressing tasks if all of the computers on a network could be upgraded by modifying one start-up code instead of a start-up code for each networked computer and if each user only had to wait for the driver programs his computer needed to boot. Start-up code, as discussed herein, is composed of two parts and the first and larger part is common start-up code that includes all instructions that cause each networked computer in a network to start-up all common components within each networked computer. In a network with multiple networked computers and a networked disk or other storage media, each of the multiple networked computers executes boot code instructions causing common start-up code to be retrieved from the same address on the networked media.

The second and smaller part of start-up code are unique driver programs for each networked computer including unique instructions required to cause start-up of unique devices for that networked computer. Each networked computer's unique driver programs are located at a different unique address on the networked media. Each networked computer executes instructions included in common start-up code causing a file containing its unique driver programs for its unique components to be retrieved from networked media.

By separating start-up code into two parts in this manner, the start-up procedure on each networked computer will thus be able to complete start-up just as if each networked computer had retrieved its own unique start-up code from the networked media. Since the largest part of start-up code is common start-up code that needs to be stored and upgraded in one instance for all networked computers, valuable memory and labor resources are conserved.

There are at least three ways that files including unique driver programs for each networked computer can be retrieved. One way is to embed addresses of unique driver programs for each of the multiple networked computers in common start-up code. Once each networked computer executes common start-up code instructions causing the executing computer to be uniquely identified, additional common start-up code instructions are executed causing unique driver programs for the executing computer to be retrieved from the correct address on the networked media.

Another method for retrieving each networked computer's unique driver programs is for each networked computer to execute common start-up code instructions causing a file from the networked media containing the addresses of the unique driver programs for each networked computer on the system to be retrieved from networked media. Once each networked computer executes common start-up code instructions causing the executing computer to be uniquely identified, additional common start-up code instructions are executed causing the unique driver programs for the executing computer to be retrieved from the correct address on the networked media.

Yet another method for retrieving each networked computer's unique driver programs is to store the address of the unique driver programs in memory on each networked computer. Once each networked computer executes common start-up code instructions causing the address of the unique driver programs for the executing computer to be retrieved from the memory of the executing computer, additional common start-up code instructions are executed causing the unique driver programs for the executing computer to be retrieved from the correct address on the networked media.

The above as well as additional objectives, features, and advantages of the present invention will become apparent in the following detailed description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
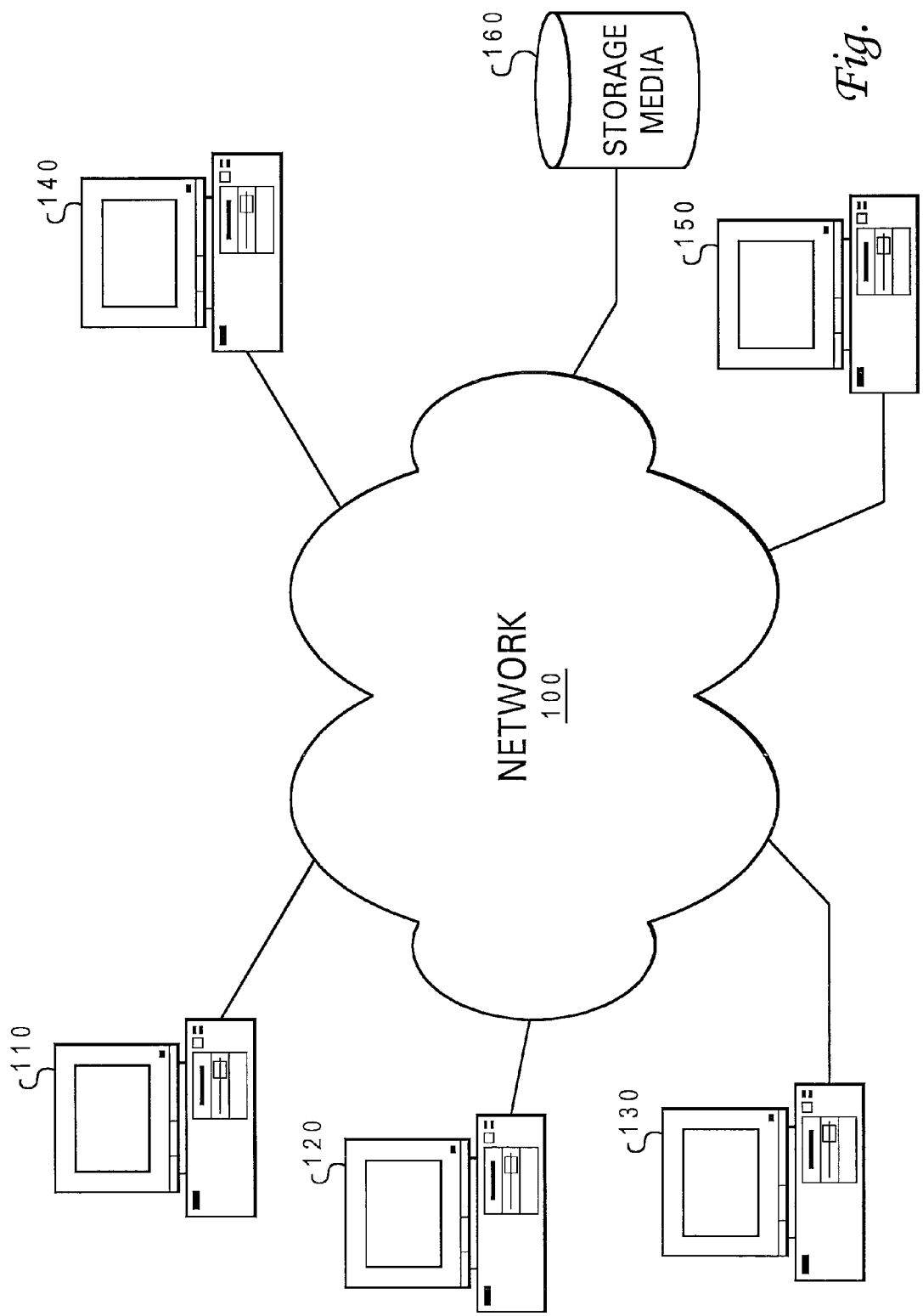
FIG. 1 is a pictorial representation of a network which may be utilized to implement the method and apparatus of the present invention.

With reference now to the figures and in particular with FIG. 1, there is depicted a pictorial representation of a network which may be utilized to implement the method and apparatus of the present invention.

As illustrated, a network 100 is a distributed network to which multiple computers and storage media are electronically coupled together. Computers 110, 120, 130, 140, 150, and storage media 160 are interconnected to each other via network 100. The details of the interconnection of computers within network 100 are thought to be well within the knowledge of one having ordinary skill in the art and consequently, forms no part of the present disclosure. One of ordinary skill in the art would also know that numerous other devices such as printers, scanners, and other computers could additionally be interconnected within network 100.

Figure 2:
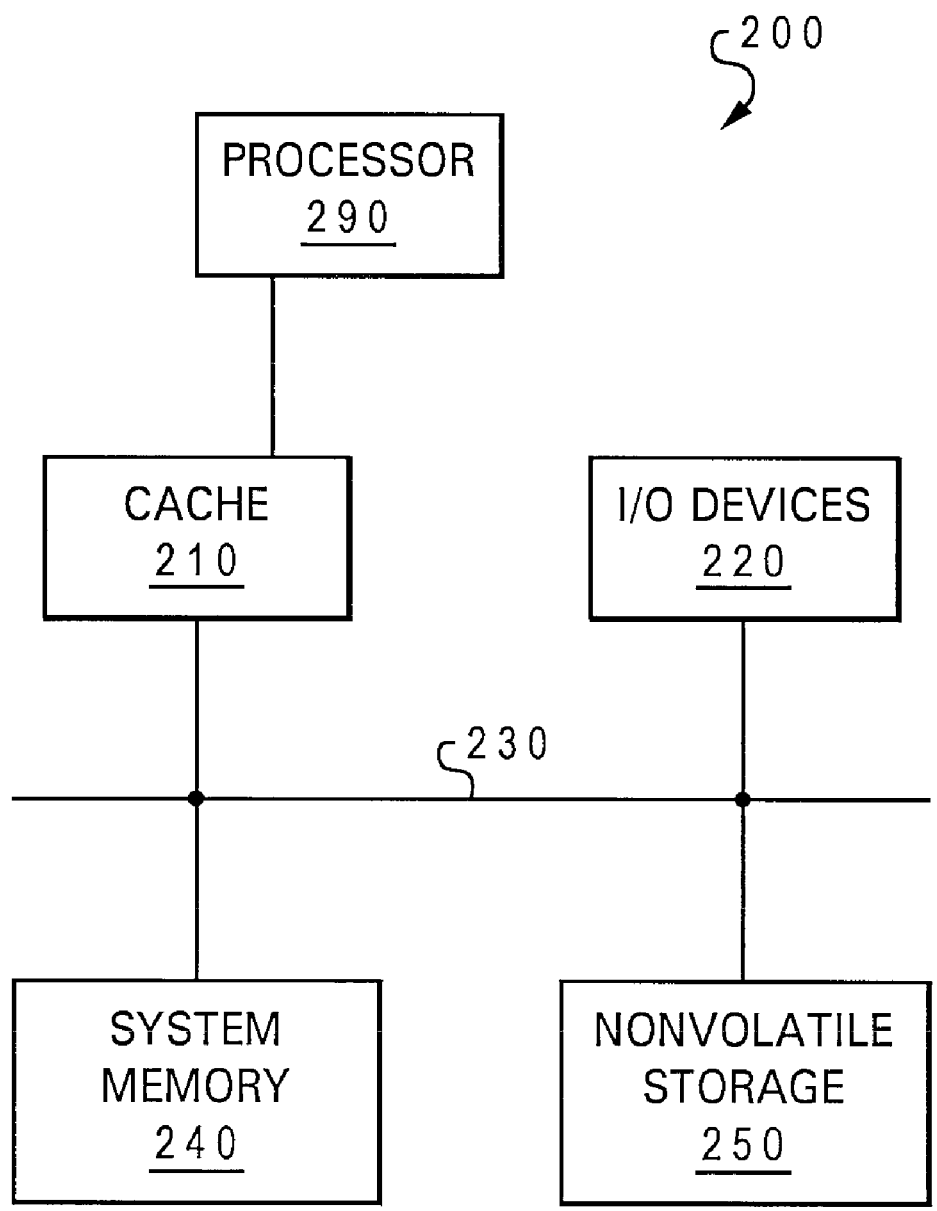
FIG. 2 is a block diagram of a computer system representative of a computer system of the present invention.

Referring now to FIG. 2, there is depicted a block diagram of a computer system representative of the preferred embodiment of the present invention. A computer system 200 includes a processor 290 coupled via a cache 210 to a system bus 230. Connected to system bus 230 are conventional memory devices including a system memory 240, typically a random access memory device, and a set of nonvolatile read-only memory (ROM) and/or erasable, electrically programmable read only memory (EEPROM) devices (not shown). Also attached to system bus 230 are a nonvolatile storage 250 such as a hard disk drive and a set of user input/output devices 220. One of ordinary skill in the art would know that many other devices could be attached to system bus 230 such as CD-R/W's, DVD-R's, floppy disk systems, and tape back up systems. The remaining details of construction and of operation of computer system 200 are well known in the relevant art, and only so much of the operation as is required for an understanding of the present invention will be described herein.

Figure 3:
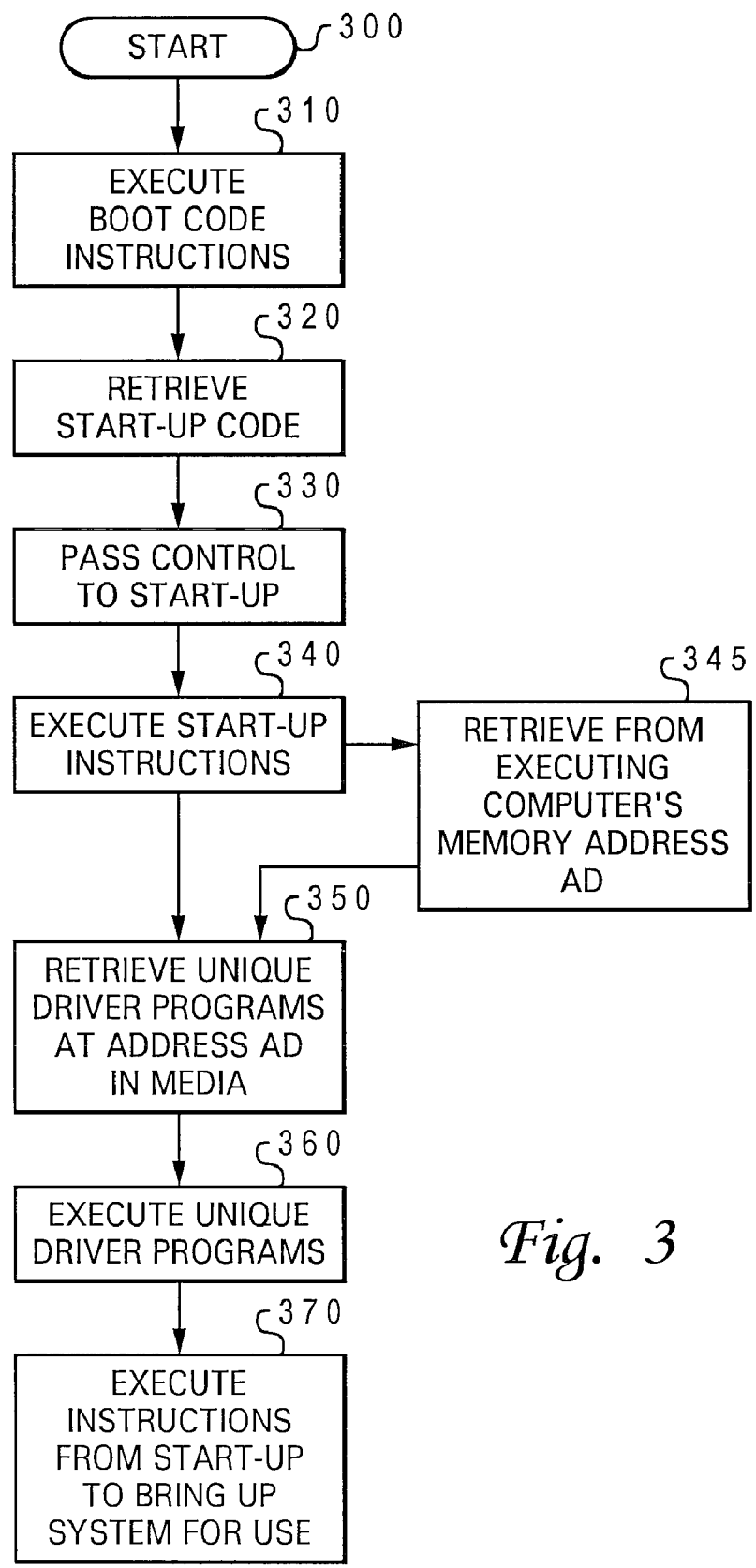
FIG. 3 is high-level logic flow diagram for booting multiple networked computers from the same disk when the address of unique driver programs is located within executing computer's memory.
Figure 4:
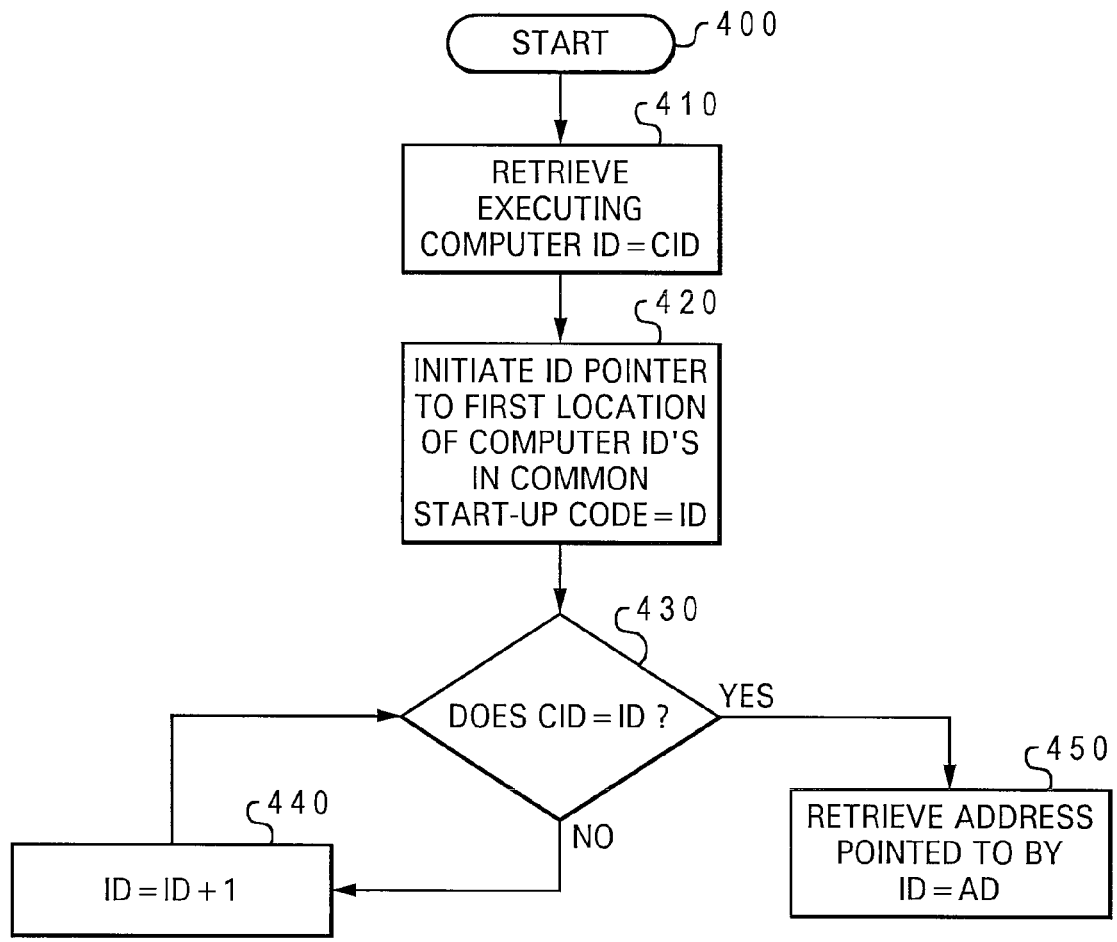
FIG. 4 is a high-level logic flow diagram for determining the correct address of unique driver programs from the common start-up code.
Figure 5:
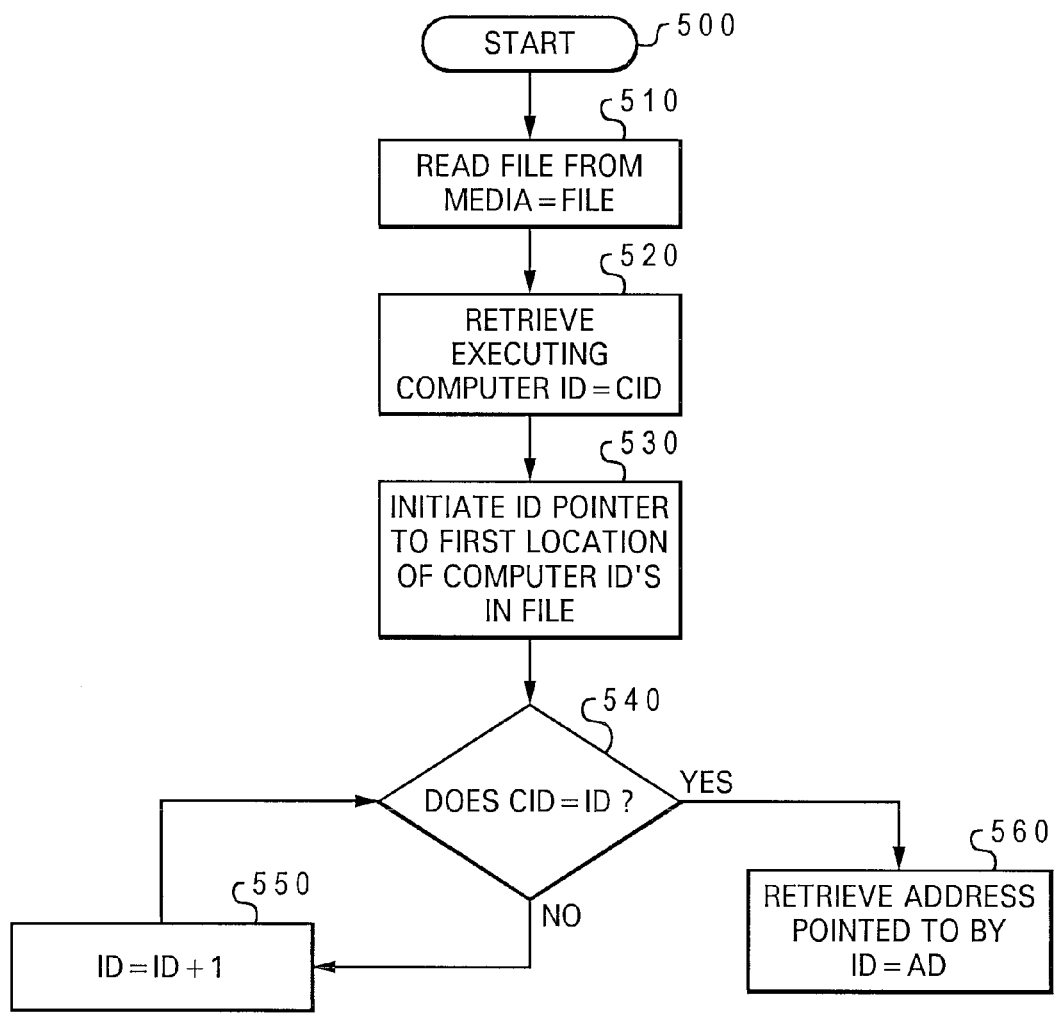
FIG. 5 is a high-level logic flow diagram for determining the correct address of unique driver programs from a file on networked media.

One of skill in the art will recognize that the steps and order of the steps in the high-level flow diagrams depicted in FIG. 3, FIG. 4, and FIG. 5 are only representative of one embodiment of the present invention.

Referencing now to FIG. 3, there is depicted a high-level flow diagram for booting multiple networked computers from the same disk. After starting as depicted in 300, the boot code located in executing networked computer's memory is executed as shown in block 310. Common start-up code is then retrieved from networked media, as shown in block 320. Boot code passes control to common start-up code as shown in block 330, and common start-up code is then executed as depicted in block 340. Address (AD) is retrieved from the executing networked computer's memory, as shown in block 345. One with skill in the art will recognize that various other methods of determining AD may be used and can replace block 345. Unique driver programs for executing networked computer are retrieved from networked media at a location pointed to by AD, as depicted in block 350, and unique driver programs are executed, as shown in block 360. One of skill in the art will recognize that unique driver programs may be retrieved from the executing computer itself or from various other media sources. Finally, the system is brought up and made available for use as depicted in block 370.

FIG. 4 is a high-level flow diagram depicting one of various other ways for determining the correct address of unique driver codes for an executing computer. In this case it is retrieving addresses that have been embedded in common start-up code. This high-level flow diagram would replace block 345 of FIG. 3. After starting as shown in block 400, Executing computer's identification (CID) is retrieved from its memory, as shown in block 410. As shown in the next block 420 a pointer is initialized to the first location of computer identification (ID) embedded in common start-up code. A determination is made as to whether CID is equal to ID as shown in 430, if they are not, ID is incremented by one, as shown in block 440 and compared to ID in block 430 until a match is found. When ID matches CID, address (AD) of unique driver programs is retrieved at location ID, as shown in block 450.

Referring now to FIG. 5, there is depicted a high-level flow diagram for determining the correct address of unique driver programs from a file on networked media. This high level flow chart would replace block 345 of FIG. 3. After starting, which is depicted in block 500, a file (FILE) containing unique driver program addresses for each networked computer is read from media as shown in block 510. Executing computer's identification (CID) is retrieved from its memory, as suggested by block 520. As shown in block 530, a pointer is initialized to the first location of computer identification (ID) in FILE. As the decision block 540 shows, CID is next compared to ID to determine if they are equal, if they are not, ID is incremented by one, as shown in block 550, and compared to ID as shown in block 540 until a match is found. When ID matches CID, address (AD) of unique driver programs is retrieved at location ID, as block 560 suggests.

In this manner, common start-up code is stored once for all networked computers to access. The prior art required either a copy start-up code for each individual networked computer or start-up code that includes every possible combination of features and devices that can be implemented on a networked computer. The method and system of the current allows faster start-up times for computer users and more efficient labor and memory resource allocation.

While the invention has been particularly shown and described with reference to a preferred embodiment, it will be understood by those skilled in the art that various changes in form and detail may be made therein without departing from the spirit and scope of the invention.

What is claimed is:

1. A method for booting and maintaining a plurality of networked computer systems utilizing a common start-up code located at a specified address in networked media and a plurality of unique driver programs, each located at a specified address in networked media, said method comprising:

executing a boot program residing in a networked computer's memory;

retrieving common start-up code from said specified address within said networked media;

executing said common start-up code;

retrieving specified addresses of unique driver programs for each networked computer system which are embedded within start-up code;

determining an identity of said networked computer system executing common start-up code;

reading in unique driver programs from said specified address in said networked media in response to identifying said networked computer system; and preparing said networked computer system for usage.

2. The method of claim 1, wherein said method further comprises:

reading a file from said networked media comprising said specified addresses for unique driver programs for each networked computer system.

3. The method of claim 1, wherein said specified address for its unique driver programs is located within each networked computer system's memory.

4. An apparatus for more efficiently booting and maintaining a plurality of networked computer systems utilizing a common start-up code located at a specified address in networked media and a plurality of unique driver programs, each located at a specified address in networked media, said system comprising:

means for executing a boot program residing in a networked computer's memory;

means for retrieving common start-up code from said specified address within said networked media;

means for executing said common start-up code;

means for retrieving specified addresses of unique driver programs for each networked computer system which are embedded within start-up code;

means for determining an identity of said networked computer system executing common start-up code;

means for reading in unique driver programs from said specified address in said networked media in response to identifying said networked computer system; and means for preparing said networked computer system for use by a user.

5. The system of claim 4, wherein said system further comprises:

means for reading a file from said networked media comprising said specified addresses for unique driver programs for each networked computer system.

6. The system of claim 4, wherein said specified address for its unique driver programs is located within each networked computer system's memory.

7. A computer program product for more efficiently booting and maintaining a plurality of networked computer systems utilizing a common start-up code located at a specified address in networked media and a plurality of unique driver programs, each located at a specified address in networked media, said computer program product comprising:

computer storage media;

program code means within said computer storage media for executing a boot program residing in a networked computer's memory;

program code means within said computer storage media for retrieving common start-up code from said specified address within said networked media;

program code means within said computer storage media for retrieving specified addresses of unique driver programs for each networked computer system which are embedded within start-up code;

program code means within said computer storage media for executing said common start-up code;

program code means within said computer storage media for determining an identity of said networked computer system executing common start-up code;

program code means within said computer storage media for reading in unique driver programs from said specified address in said networked media in response to identifying said networked computer system; and program code means within said computer storage media for preparing said networked computer system for use by a user.

8. The computer program product of claim 7, said computer program product further comprising instruction for:

reading a file from said networked media comprising said specified addresses for unique driver programs for each networked computer system.

9. The computer program product of claim 7 wherein said specified address for its unique driver programs is located within each networked computer system's memory.

* * * * *